(12) United States Patent  
Chen et al.

(10) Patent No.: US 8,247,999 B2
(45) Date of Patent: Aug. 21, 2012

(54) TIME DIVISION MULTIPLEXING A DC-TO-DC VOLTAGE CONVERTER

(75) Inventors: Gang Chen, Basking Ridge, NJ (US); David A Duque, Hillsborough, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 268 days.

(21) Appl. No.: 12/009,851

(22) Filed: Jan. 22, 2008

(65) Prior Publication Data

US 2009/0184659 A1    Jul. 23, 2009

(51) Int. Cl.
*H05B 37/02* (2006.01)
*G05F 1/00* (2006.01)

(52) U.S. Cl. ............ 315/307; 315/185 R; 315/294; 323/282

(58) Field of Classification Search ........... 315/185 R, 315/224, 291, 294, 307–308; 323/207, 282, 323/315; 363/21.04, 21.12, 159
See application file for complete search history.

(56) References Cited

U.S. PATENT DOCUMENTS

| | | |
|---|---|---|
| 3,546,374 A | 12/1970 | Graser, Jr. |
| 3,549,240 A | 12/1970 | Sawatari |
| 3,573,353 A | 4/1971 | Henriques et al. |
| 3,719,127 A | 3/1973 | Mueller |
| 3,879,110 A | 4/1975 | Furukawa |
| 4,281,904 A | 8/1981 | Sprague et al. |
| 4,410,839 A | 10/1983 | Dobkin .................. 315/320 |
| 4,471,445 A | 9/1984 | Pernick |
| 4,522,466 A | 6/1985 | Lindig et al. |
| 4,834,476 A | 5/1989 | Benton .................. 350/3.76 |
| 4,884,869 A | 12/1989 | Uemura |
| 4,986,619 A | 1/1991 | Walker et al. |
| 5,032,002 A | 7/1991 | Fonneland et al. |
| 5,166,742 A | 11/1992 | Kobayashi et al. |
| 5,172,251 A | 12/1992 | Benton et al. ............... 359/9 |
| 5,192,946 A | 3/1993 | Thompson et al. |
| 5,239,322 A | 8/1993 | Takanashi et al. ........... 353/31 |
| 5,272,473 A | 12/1993 | Thompson et al. |
| 5,327,270 A | 7/1994 | Miyatake |
| 5,412,674 A | 5/1995 | Scheps |
| 5,440,352 A | 8/1995 | Deter et al. |
| 5,506,597 A | 4/1996 | Thompson et al. ........... 345/85 |
| 5,596,451 A | 1/1997 | Handschy et al. ........... 359/633 |
| 5,617,227 A | 4/1997 | De Bougrenet De La Tocnaye et al. .......................... 349/57 |
| 5,798,819 A | 8/1998 | Hattori et al. ................ 353/33 |
| 5,834,331 A | 11/1998 | Razeghi ...................... 438/40 |
| 6,211,848 B1 | 4/2001 | Plesniak et al. .............. 345/1 |

(Continued)

FOREIGN PATENT DOCUMENTS

DE    25 06 582 A1    8/1796

(Continued)

OTHER PUBLICATIONS

U.S. Appl. No. 12/017,984, filed Jan. 22, 2008, Gang Chen, et al.

(Continued)

*Primary Examiner* — Tung X Le
(74) *Attorney, Agent, or Firm* — C. Bilicska (57) ABSTRACT

An apparatus includes a DC-to-DC voltage converter. The DC-to-DC voltage converter has a plurality of pairs of outputs and is configured to apply voltages across the pairs of outputs in a time division multiplexed manner.

18 Claims, 8 Drawing Sheets

U.S. PATENT DOCUMENTS

| | | | |
|---|---|---|---|
| 6,250,778 B1 | 6/2001 | Doumuki | |
| 6,304,237 B1 | 10/2001 | Karakawa | |
| 6,317,169 B1 | 11/2001 | Smith | |
| 6,323,984 B1 | 11/2001 | Trisnadi | 359/245 |
| 6,377,403 B1 | 4/2002 | Smith | |
| 6,426,836 B2 | 7/2002 | Dorsel et al. | 359/443 |
| 6,577,429 B1 | 6/2003 | Kurtz et al. | 359/279 |
| 6,594,090 B2 | 7/2003 | Kruschwitz et al. | 359/707 |
| 6,600,590 B2 | 7/2003 | Roddy et al. | 359/287 |
| 6,621,235 B2 * | 9/2003 | Chang | 315/216 |
| 6,625,381 B2 | 9/2003 | Roddy et al. | 385/147 |
| 6,771,326 B2 | 8/2004 | Flint | 348/744 |
| 6,791,739 B2 | 9/2004 | Ramanujan et al. | 359/279 |
| 6,797,983 B2 | 9/2004 | Chen et al. | 257/59 |
| 6,870,650 B2 | 3/2005 | Kappel et al. | |
| 6,876,484 B2 | 4/2005 | Greywall | 359/291 |
| 6,902,276 B2 | 6/2005 | Glenn | 353/98 |
| 6,906,839 B2 | 6/2005 | Gerchberg | |
| 6,940,577 B2 | 9/2005 | Kozhukh | 349/156 |
| 6,947,459 B2 | 9/2005 | Kurtz et al. | |
| 6,950,454 B2 | 9/2005 | Kruschwitz et al. | |
| 6,984,917 B2 | 1/2006 | Greywall et al. | 310/310 |
| 7,099,063 B2 | 8/2006 | Greywall | 359/290 |
| 7,133,643 B2 | 11/2006 | Kneissl et al. | 257/14 |
| 7,156,522 B2 | 1/2007 | Plut | |
| 7,161,608 B2 | 1/2007 | Pettitt et al. | |
| 7,244,028 B2 | 7/2007 | Govorkov et al. | |
| 7,261,453 B2 | 8/2007 | Morejon et al. | |
| 7,268,852 B2 | 9/2007 | Kuan et al. | 349/165 |
| 7,289,209 B2 | 10/2007 | Kowarz et al. | |
| 7,298,532 B2 | 11/2007 | Thomas et al. | |
| 7,307,786 B2 | 12/2007 | Hatjasalo et al. | 359/569 |
| 7,317,403 B2 * | 1/2008 | Grootes et al. | 340/815.45 |
| 7,342,658 B2 | 3/2008 | Kowarz et al. | |
| 7,355,657 B2 | 4/2008 | Chilla et al. | |
| 7,413,311 B2 | 8/2008 | Govorkov et al. | |
| 7,423,808 B2 | 9/2008 | Lee | |
| 7,481,541 B2 | 1/2009 | Maximus et al. | 353/85 |
| 7,492,948 B2 | 2/2009 | Gluckstad | |
| 7,502,160 B2 | 3/2009 | Aksyuk et al. | 359/290 |
| 7,538,948 B2 | 5/2009 | Muenz et al. | |
| 7,595,622 B1 * | 9/2009 | Tomiyoshi et al. | 323/285 |
| 7,646,154 B2 * | 1/2010 | Kang et al. | 315/312 |
| 7,646,518 B2 | 1/2010 | Kasazumi | |
| 7,688,002 B2 * | 3/2010 | Ashdown et al. | 315/291 |
| 7,782,521 B2 | 8/2010 | Khan et al. | |
| 7,843,150 B2 * | 11/2010 | Wang et al. | 315/307 |
| 7,866,831 B2 | 1/2011 | Kasazumi et al. | |
| 7,944,598 B2 | 5/2011 | Gollier | |
| 8,059,340 B2 | 11/2011 | Khan et al. | |
| 8,109,638 B2 | 2/2012 | Chen et al. | |
| 2001/0019434 A1 | 9/2001 | Popovich et al. | |
| 2001/0022613 A1 | 9/2001 | Matsui et al. | |
| 2002/0034710 A1 | 3/2002 | Morris et al. | 430/321 |
| 2002/0140380 A1 * | 10/2002 | Biebl | 315/291 |
| 2003/0025842 A1 | 2/2003 | Saccomanno | |
| 2003/0039036 A1 | 2/2003 | Kruschwitz et al. | |
| 2003/0117022 A1 | 6/2003 | Janning | 307/36 |
| 2003/0165013 A1 | 9/2003 | Doany et al. | 359/485 |
| 2003/0218794 A1 | 11/2003 | Takeda et al. | |
| 2004/0008392 A1 | 1/2004 | Kappel et al. | |
| 2004/0213515 A1 | 10/2004 | Pezeshki et al. | |
| 2004/0239880 A1 | 12/2004 | Kapellner et al. | 353/20 |
| 2004/0257007 A1 * | 12/2004 | Lys et al. | 315/294 |
| 2004/0263802 A1 | 12/2004 | Seki et al. | |
| 2005/0013005 A1 | 1/2005 | Rogers | |
| 2005/0147135 A1 | 7/2005 | Kurtz et al. | |
| 2005/0219675 A1 | 10/2005 | Aksyuk et al. | 359/224 |
| 2005/0243282 A1 | 11/2005 | Peterson et al. | |
| 2005/0253055 A1 | 11/2005 | Sprague et al. | |
| 2005/0264271 A1 | 12/2005 | Lam et al. | 323/282 |
| 2006/0018025 A1 | 1/2006 | Sharon et al. | |
| 2006/0028961 A1 | 2/2006 | Kim et al. | 369/112.01 |
| 2006/0061214 A1 | 3/2006 | Chapuis | 307/11 |
| 2006/0066964 A1 | 3/2006 | Greywall | 359/849 |
| 2006/0109386 A1 | 5/2006 | Serafimovich et al. | |
| 2006/0109553 A1 | 5/2006 | Serafimovich et al. | |
| 2006/0126022 A1 | 6/2006 | Govorkov et al. | |
| 2006/0126151 A1 | 6/2006 | Aksyuk et al. | 359/291 |
| 2006/0175622 A1 | 8/2006 | Richards et al. | |
| 2006/0181770 A1 | 8/2006 | Lee | |
| 2006/0227440 A1 | 10/2006 | Gluckstad | |
| 2006/0267449 A1 | 11/2006 | Aksyuk et al. | 310/309 |
| 2007/0024213 A1 * | 2/2007 | Shteynberg et al. | 315/291 |
| 2007/0046907 A1 | 3/2007 | Shin | 353/119 |
| 2007/0070296 A1 | 3/2007 | Iwanaga | |
| 2007/0070302 A1 | 3/2007 | Govorkov et al. | |
| 2007/0153378 A1 | 7/2007 | Lee | |
| 2007/0153866 A1 | 7/2007 | Shchegrov et al. | |
| 2007/0216982 A1 | 9/2007 | Sanders et al. | |
| 2007/0251916 A1 | 11/2007 | Akahane et al. | |
| 2007/0257623 A1 * | 11/2007 | Johnson et al. | 315/193 |
| 2007/0262724 A1 * | 11/2007 | Mednik et al. | 315/125 |
| 2007/0279731 A1 | 12/2007 | Blumberg | 359/291 |
| 2008/0018266 A1 * | 1/2008 | Yu et al. | 315/291 |
| 2008/0100224 A1 * | 5/2008 | Felder et al. | 315/151 |
| 2008/0116818 A1 * | 5/2008 | Shteynberg et al. | 315/192 |
| 2008/0158513 A1 | 7/2008 | Bartlett et al. | |
| 2008/0192264 A1 | 8/2008 | Heiden | |
| 2008/0198334 A1 | 8/2008 | Kasazumi et al. | |
| 2008/0212034 A1 | 9/2008 | Aksyuk et al. | |
| 2008/0212040 A1 | 9/2008 | Aksyuk | |
| 2008/0212159 A1 | 9/2008 | Giles et al. | 359/238 |
| 2008/0219303 A1 | 9/2008 | Chen et al. | |
| 2008/0297128 A1 * | 12/2008 | Xu et al. | 323/282 |
| 2009/0009719 A1 | 1/2009 | Ryf | |
| 2009/0096999 A1 | 4/2009 | Frahm et al. | |
| 2009/0153579 A1 | 6/2009 | Ichikawa et al. | |
| 2009/0158140 A1 | 6/2009 | Bauchot et al. | |
| 2009/0184659 A1 | 7/2009 | Chen et al. | |
| 2009/0184976 A1 | 7/2009 | Chen et al. | |
| 2009/0185141 A1 | 7/2009 | Chen et al. | |
| 2009/0191489 A1 | 7/2009 | Sandstrom | |
| 2009/0310087 A1 | 12/2009 | Itoh et al. | |

FOREIGN PATENT DOCUMENTS

| | | |
|---|---|---|
| EP | 1 011 186 A2 | 6/2000 |
| EP | 1 283 434 A2 | 2/2003 |
| EP | 1 292 124 A2 | 3/2003 |
| EP | 1 703 318 A1 | 9/2006 |
| EP | 1 734 771 A1 | 12/2006 |
| EP | 1 750 441 A2 | 2/2007 |
| JP | 04 105521 A | 4/1992 |
| JP | 07 336776 A | 12/1995 |
| JP | 2002131689 | 5/2002 |
| JP | 2003098476 A | 4/2003 |
| KR | 20060013023 A | 2/2006 |
| WO | WO 2004/064410 A1 | 7/2004 |
| WO | 2006104704 A1 | 10/2006 |
| WO | WO 2007/024503 A1 | 3/2007 |
| WO | 2007072335 A2 | 6/2007 |
| WO | 2008108947 A1 | 9/2008 |
| WO | 2009040822 A2 | 4/2009 |
| WO | 2010023444 A1 | 3/2010 |

OTHER PUBLICATIONS

U.S. Appl. No. 12/017,440, filed Jan. 22, 2008, Gang Chen, et al.
U.S. Appl. No. 12/009,991, filed Jan. 22, 2008, Gang Chen, et al.
U.S. Appl. No. 11/713,483, filed Mar. 2, 2007, Gang Chen, et al.
U.S. Appl. No. 11/713,207, filed Mar. 2, 2007, Randy Giles, et al.
U.S. Appl. No. 11/681,376, filed Mar. 2, 2007, Vladimir Aksyuk, et al.
U.S. Appl. No. 11/713,155, filed Mar. 2, 2007, Vladimir Aksyuk, et al.
PCT International Search Report dated May 18, 2009 (PCT/US 2009/000352) 3 pages.
Kerigan, SC, et al., "Perceived Speckle Reduction in Projection Display Systems", *IBM Technical Disclosure Bulletin*, Jul. 1997, vol. 40, No. 7, available online at IP.com, IP.com Journal, No. IPCOM000118774D; pp. 9-11, XP-013106711.
J. W. Goodman, "Some Fundamental Properties of Speckle", *Journal of the Optical Society of America, American Institute of Physics*, New York, vol. 66, No. 11, Nov. 1, 1976, pp. 1145-1150, XP-002181682.

PCT International Search Report dated Jun. 10, 2008 (PCT/US2008/002551) 4 pages.

PCT International Search Report dated Jul. 8, 2009 (PCT/US 2009/000350) 4 pages.

Moulton et al., "High-Powered RGB Laser Source for Displays," presented at the IMAGE 2002 Conference, Scottsdale, AZ 7/8-12 2002, 4 pp., Date: Jul. 2002.

"Presentation Industry's First Texas Instruments Digital Light Processing Technology Projector with DCDi for Color Critical and Home Theater Applications," Dec. 18, 2001, downloaded from http://www.hcinema.de/pdf/presse/mitsubishixd200-press-en.pdf 2 pp.

Fienup, J.R., "Reconstruction of an object from the modulus of its Fourier transform," Optics Letters, vol. 3, No. 1, pp. 27-29, Jul. 1978.

Fienup, J.R. "Phase retrieval algorithms: a comparison." Applied Optics, vol. 21, No. 15, pp. 2758-2769, Aug. 1, 1982.

Zalevsky, Z. et al., "Gerchberg-Saxton algorithm applied in the fractional Fourier or the Fresnel domain," Optics Letters, vol. 21, No. 12, pp. 842-844, Jun. 15, 1996.

Watson, G.P. et al., "Comparison of tilting and piston mirror elements for 65 nm mode spatial light modulator optical maskless lithography," J. Vac. Technol., vol. B 22, No. 6, pp. 3038-3042, Nov./Dec. 2004.

"PVPro Enabling personal video projectors", Light Blue Optics Ltd., available online at: www.lightblueoptics.com, (2006) 5 pages.

R.W. Gerchberg and W.O. Saxton, "Phase Determination from Image and Diffraction Plane Pictures in the Electron Microscope", OPTIK, vol. 34, No. 3 (1971), pp. 275-284.

R.W. Gerchberg and W.O. Saxton, "A Practical Algorithm for the Determination of Phase from Image and Diffraction Plane Pictures" OPTIK, vol. 35, No. 2 (1972), pp. 237-246.

"A Tail of Two Cats", published on line at: http://www.ysbl.york.ac.uk/-cowtan/fourier/coeff.html, Dec. 15, 2006, 3 pages.

K. Greene, "Pocket Projectors" published on line at: http://www.technologyreview.com/BizTech/17860/, Technology Review, Dec. 6, 2006, 3 pages.

K. Greene, "Ultra-Colorful TV" published online at: http://www.technologyreview.com/read_article.aspx?id=17651&ch=infotech&sc=&pg=2, Technology Review, Oct. 24, 2006, pp. 1-4.

Lucente, Mark, "Diffraction-Specific Fringe Computation for Electro-Holography,"Ph.D Thesis, Dept. of Electrical Engineering and Computer Science, Massachusetts, Institute of Technology, available online at http://www.lucente.biz/pubs/PhDthesis/contents.html, Sep. 1994, 163 pages.

R. W. Gerchberg, "Super-resolution through error energy reduction", OPTICA ACTA, 1974, vol. 21, No. 9, pp. 709-720.

"Novalux Delivers High-Power, Blue, Solid-State Light Sources to Consumer Electronics Partners", published on line at: http://novalux.com/company/press.php?release=5, Nov. 7, 2005, 2 pages.

"Single and Dual Panel LC Projection Systems," by M. G. Robinson, J. Chen, G. D. Sharp, Wiley, Chichester (England), 2005, Chapter 11, pp. 257-275.

"Study of a New Ytterbium Doped Phosphate Laser Glass," by DAI Shixun et al., Chinese Science Bulletin, vol. 47, No. 3, Feb. 2002, pp. 255-259.

"A Tunable Short, (5cm) Glass Fiber Laser for Helium Optical Pomping," by L.D. Schearer et al., Journal De Physique IV, Article published online by EDP Sciences and available at http://dx.dbi.org/10.1051/jp4:1991787, 4 pages, Date: Dec. 1991.

"Spectrum Stability of A Broadband 1060nm Nd-Doped Fibre Laser," Electronics Letters, vol. 26, No. 13, Jun. 21, 1999, 3 pages.

"Efficient Second Harmonic Generation of Femtosecond Laser at 1 μm," by Heyuan Zhu et al., May 17, 2004, vol. 12, No. 10, Optics Express 2150, 6 pages.

* cited by examiner

OPERATE A DC-TO-DC VOLTAGE CONVERTER TO APPLY DRIVING VOLTAGES ACROSS A PLURALITY OF INDIVIDUAL ELECTRONIC COMPONENTS IN A TIME DIVISION MULTIPLEXED MANNER

TIME DIVISION MULTIPLEXING A DC-TO-DC VOLTAGE CONVERTER

BACKGROUND

1. Field of the Invention

The invention relates generally to direct current-to-direct current (DC-to-DC) voltage converters and to apparatus and methods that use DC-to-DC voltage converters.

2. Discussion of the Related Art

This section introduces aspects that may help facilitate a better understanding of the inventions. Accordingly, the statements of this section are to be read in this light and are not to be understood as admissions about what is prior art or what is not prior art.

There are various types of DC-to-DC voltage converters. Examples of DC-to-DC voltage converters include the buck DC-to-DC voltage converter, the boost DC-to-DC voltage converter, the buck-boost DC-to-DC voltage converter, the cuk DC-to-DC voltage converter, the flyback DC-to-DC voltage converter, and the forward DC-to-DC voltage converter. Typical DC-to-DC voltage converters include one or more inductors, one or more capacitors, a switching circuit, and a DC voltage source.

Herein, a switching circuit opens and closes a connection in an approximately periodic manner. Examples include a transistor switch that is controlled by alternating current (AC). Herein, a closed circuit or path conducts a DC current, and an open circuit or path does not conduct a DC current.

In a DC-to-DC voltage converter, the switching circuit brings the DC-to-DC voltage converter to an approximate steady-state in which the output voltage has an average value that is determined by the duty cycle of the switching circuit and the DC source voltage. In the steady state, some DC-to-DC voltage converters step up the DC source voltage, some DC-to-DC voltage converters step down the DC source voltage, and some other DC-to-DC voltage converters can either step up or step down the DC source voltage.

Some devices include an array of electronic components that need to be driven by regulated DC power supplies. A regulated DC power supply can be achieved with an array of DC-to-DC voltage converters in which each DC-to-DC voltage converter drives a corresponding one of the electronic components.

SUMMARY

Various embodiments provide DC-to-DC voltage converters that are configured to time division multiplex their output voltages among individual electronic components of an array.

One embodiment features a first apparatus that includes a DC-to-DC voltage converter. The DC-to-DC voltage converter has a plurality of pairs of outputs and is configured to apply voltages across the pairs of outputs in a time division multiplexed manner.

In some embodiments of the first apparatus, the DC-to-DC voltage converter further includes a plurality of shunt circuit paths. Each shunt circuit path connects between the outputs of a corresponding one of the pairs of outputs and has a switch there along. In some such embodiments, the DC-to-DC voltage converter may also include an electronic controller configured to operate the switches on the shunt circuit paths. The electronic controller may be configured to open only one of the switches at a time during operation. In some such embodiments, the shunt circuit paths may be electrically connected in series.

In other embodiments of the first apparatus, the DC-to-DC voltage converter further includes circuit paths connected in parallel. Each circuit path has a corresponding one of the pairs of outputs there along and has a controllable switch there along.

Some embodiments of the first apparatus include a plurality of light sources. Each light source is connected across a corresponding one of the pairs of outputs. In some such embodiments, some of the light sources are, e.g., light emitting diodes, and each light source is configured to emit light of a different color, e.g., red, green, and blue.

Another embodiment features a second apparatus that includes a DC-to-DC voltage converter and a plurality of electronic loads connected to share the DC-to-DC voltage converter. The DC-to-DC voltage converter has an electronic controller and a plurality of circuit paths. The electronic loads are either connected across corresponding ones of the circuit paths or are part of corresponding ones of the circuit paths. Each circuit path includes a switch there along, and the controller is connected to operate the switches of the circuit paths.

In some embodiments of the second apparatus, the electronic controller is configured to open only one of the switches at a time during driving operation.

In some embodiments of the second apparatus, each circuit path is a shunt circuit path for the corresponding one of the electronic loads, and the circuit paths are electrically connected in series.

In some embodiments of the second apparatus, the circuit paths are electrically connected in parallel and the electronic loads are part of corresponding ones of the circuit paths.

In some embodiments of the second apparatus, the DC-to-DC voltage converter is one of a boost DC-to-DC voltage converter, a buck DC-to-DC voltage converter, a buck-boost DC-to-DC voltage converter, and a CUK DC-to-DC voltage converter.

Some embodiments of the second apparatus further include a plurality of light sources. Each light source is one of the electronic loads.

In some embodiments of the second apparatus, the DC-to-DC voltage converter is configured to apply a first voltage across a first of the electronic loads and to apply a different second voltage across a second of the electronic loads.

Another embodiment features a method of electrically driving a plurality of electronic components. The method includes operating a DC-to-DC voltage converter in a shared manner in which the DC-to-DC voltage converter applies voltages across the electronic components in a time division multiplexed manner.

In some embodiments of the method, the act of operating includes having the DC-to-DC voltage converter apply a first voltage across one of the electronic components and apply a different second voltage across another of the electronic components.

In some embodiments of the method, the act of operating includes causing a shunt circuit path around each one of the electronic components to close when the DC-to-DC voltage converter is not applying a voltage to the one of the electronic components.

In some embodiments of the method, the act of operating includes simultaneously causing a circuit path with one of the electronic components to close and causing the one or more circuit paths with any other of electronic components to open when applying a voltage to the one of the electronic components. In such embodiments, the circuit paths are connected in parallel.

In some embodiments, the method further includes then, discharging a capacitor while the electronic components are not being driven and then, repeating the operating step. Charges on the capacitor drive the electronic components during the operating steps.

BRIEF DESCRIPTION OF THE FIGURES

In the Figures, similar reference numbers refer to features with substantially similar functions and/or structures.

In some of the Figures, relative dimensions of some features may be exaggerated to more clearly illustrate the structures shown therein.

While the Figures and the Detailed Description of Illustrative Embodiments describe some embodiments, the inventions may have other forms and are not limited to those described in the Figures and the Detailed Description of Illustrative Embodiments.

DETAILED DESCRIPTION OF ILLUSTRATIVE EMBODIMENTS

Various embodiments provide systems and method in which DC-to-DC voltage converters can drive electronic components in a temporally multiplexed manner. Substantial parts of the circuits of the DC-to-DC voltages converter are temporally shared to drive the different electronic components. The temporally shared components may include, e.g., inductor(s), capacitor(s), a switching circuit, and a DC voltage source. By such sharing configurations, some such DC-to-DC voltage converters can be constructed in more compact architectures and/or at lower costs than systems in which each electronic component is driven by a corresponding DC-to-DC voltage converter.

Various embodiments herein may, e.g., drive multi-color light sources, e.g., sources with three diodes, lasers and/or laser diodes of different colors, and may be used, e.g., in multi-color image projectors and/or image projection methods as described in co-filed U.S. patent application Ser. No. 12/009,991 titled "MULTI-COLOR LIGHT SOURCE" by Gang Chen and Roland Ryf; co-filed U.S. patent application Ser. No. 12/017,440 titled "DIFFUSER CONFIGURATION FOR AN IMAGE PROJECTOR" by Gang Chen and Roland Ryf; and/or co-filed U.S. patent application Ser. No. 12/017,984 titled "SYSTEM AND METHOD FOR COLOR-COMPENSATING A VIDEO SIGNAL HAVING REDUCED COMPUTATIONAL REQUIREMENTS" by Gang Chen and Roland Ryf. The above three patent applications are being filed on the same day as the present application and are incorporated herein by reference in their entirety.

Various embodiments herein may also be used to drive multi-color light sources used in optical projectors, optical projection methods, and/or speckle reduction methods and/or apparatus as described in: U.S. patent application Ser. No. 11/713,207 filed Mar. 2, 2007 by Randy C. Giles et al; U.S. patent application Ser. No. 11/681,376 filed Mar. 2, 2007 by Vladimir A. Aksyuk et al; U.S. patent application Ser. No. 11/713,155 filed Mar. 2, 2007 by Vladimir A. Aksyuk et al; and/or U.S. patent application Ser. No. 11/713,483 filed Mar. 2, 2007 by Gang Chen et al. These four patent applications are also incorporated herein by reference in their entirety.

Various other embodiments herein may be used to drive a variety of other types of electrical components, e.g., an array of electrical components that can be individually driven. For example, various embodiments provide apparatus and methods for driving electronic components under constant DC voltage conditions and/or constant DC current conditions. The embodiments are not intended to be limited, e.g., to drivers and driving of the light emitters of multi-color light sources.

FIGS. 1-6 illustrate DC-to-DC voltage converters 10A, 10B, 10C, 10D, 10E, 1 OF that include a output driver circuit path 12 and an electronic controller 14.

The various DC-to-DC voltage converters 10A, 10B, 10C, 10D, 10E, 10F have different output and input characteristics. The DC-to-DC voltage converter 10A is in a boost type DC-to-DC voltage converter that steps up a voltage of a DC voltage source 16. The DC-to-DC voltage converters 10B-10C are buck type DC-to-DC voltage converters that step down the voltage of the DC voltage source 16. The DC-to-DC voltage converters 10D-10E are buck-boost DC-to-DC voltage converters that can, e.g., be operated to either step up or step down the voltage of the DC voltage source 16. The DC-to-DC voltage converter 10F is in a CUK DC-to-DC voltage converter that that can, e.g., be operated to either step up or step down the voltage of the DC voltage source 16 and can temporally smooth the current flows from the DC voltage source 16 and to the output driver circuit path 12.

The output driver circuit path 12 has contacts α and β across which the DC-to-DC voltage converters 10A-10F apply an output voltage, $V_O$. The output driver circuit path 12 is operated by the electronic controller 14 to drive an array of N electronic loads with the output voltage, $V_O$, in a time division multiplexed manner. The output driver circuit path 12 can have a first form or a second form. In the first form, the output driver circuit path 12 includes a serially connected array of controllable circuit paths, and each electronic load connects across the ends of a corresponding one of the controllable circuit paths. In the second form, the output drive circuit path 12 includes a parallel connected array of controllable circuit paths, and each circuit path includes a corresponding one of the electronic loads.

The electronic controller 14 controls the output driver circuit path 12. In particular, the electronic controller 14 includes circuitry that configures the output drive circuit path 12 to selectively drive one of the electronic loads of the array and to selectively not drive other electronic loads of the array at a particular time. Thus, the electronic controller 14 can cause the output driver circuit path 12 to drive the electronic loads in time division multiplexed manner, e.g., so that only one of the electronic loads is driven at any one time.

Figure 8:
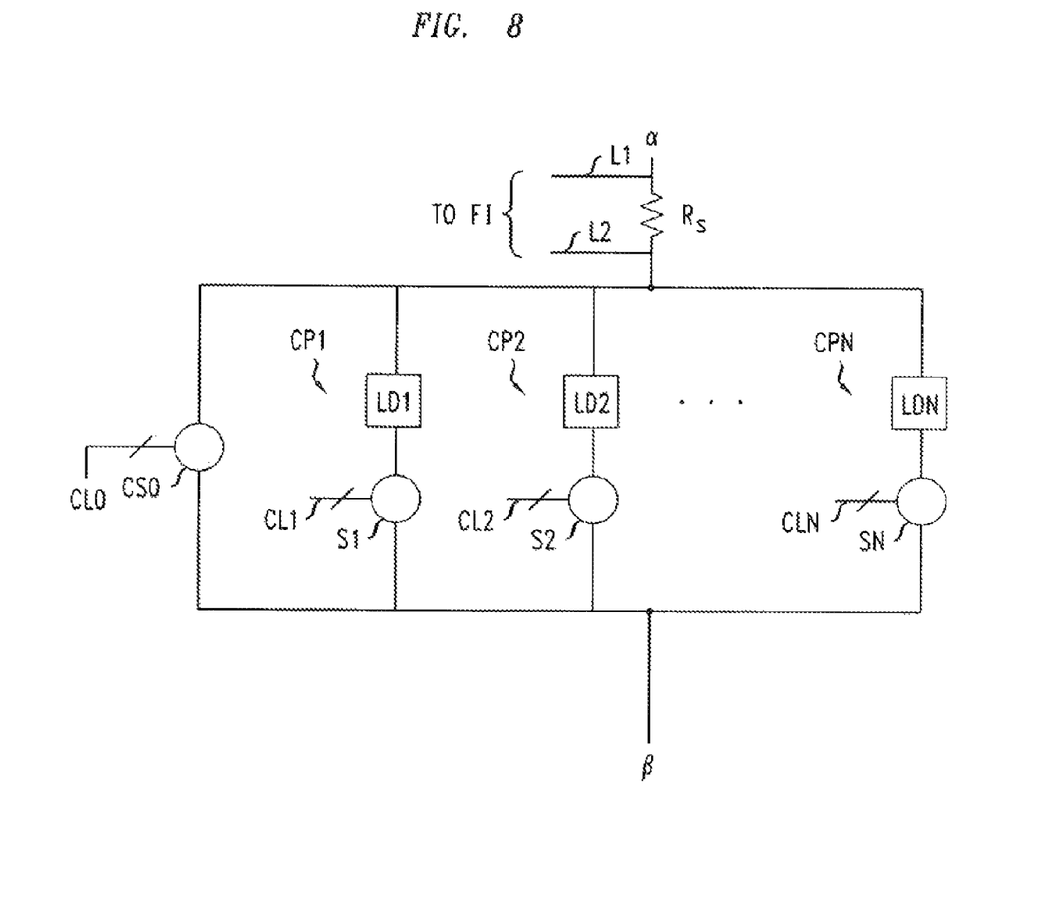
FIG. 8 is a circuit diagram illustrating a parallel-type embodiment of an output driver circuit path for the DC-to-DC voltage converters of FIGS. 1-6.

Each DC-to-DC voltage converter 10A-10F also includes the DC voltage source 16, one or more conventional inductors 18, one or more conventional capacitors 20, one or more diodes 22, and a conventional switching circuit 24. The DC voltage source 16 supplies a preset DC source voltage, $V_S$. The inductor(s) 18 and capacitor(s) 20 are conventional circuit devices whose forms can affect transient characteristics of DC-to-DC voltage converters 10A-10F and boundaries between discontinuous-mode and continuous-mode steady-state operation regions thereof. The one or more diode(s) 22 are also conventional circuit device, e.g., Schottky diodes. The switching circuit 24 is configured to open and close the electrical connection between its input, I, and its output, O, at a preselected frequency thereby enabling the DC-to-DC voltage regulators 10A-10F to convert the DC source voltage, $V_S$, to an approximately constant DC output voltage, $V_O$, when steady state operation is achieved. Exemplary switching circuits 24 include a switching voltage source and a switch whose control input, e.g., a gate of a field effect transistor switch or a base of a bipolar transistor switch as shown in FIG. 8, is driven by the switching voltage source. The switching voltage source includes an alternating current (AC) component, e.g., a saw tooth component, and may include a DC component that enables regulation of the duty value, D, of the switching circuit 24. Herein, the ratio of the time per cycle that a switching circuit is closed over the total length of the switching circuit's operating cycle, i.e., a cycle to open and close, is the duty value, D, of the switching circuit.

In some embodiments, the electronic controller 14 may control and/or regulate the duty value, D, of the switching circuit 24, and/or the duty value of the switching circuit 24 may be auto adjusted based on a voltage value fedback from the output driver circuit path 12. For example, the electronic controller 14 may be connected to apply a DC offset to the control input of a switching transistor in the switching circuit, e.g., the gate of an FET switch or the base of a bipolar transistor switch, thereby adjusting the duty value, D, of the switching circuit 24.

Figure 1:
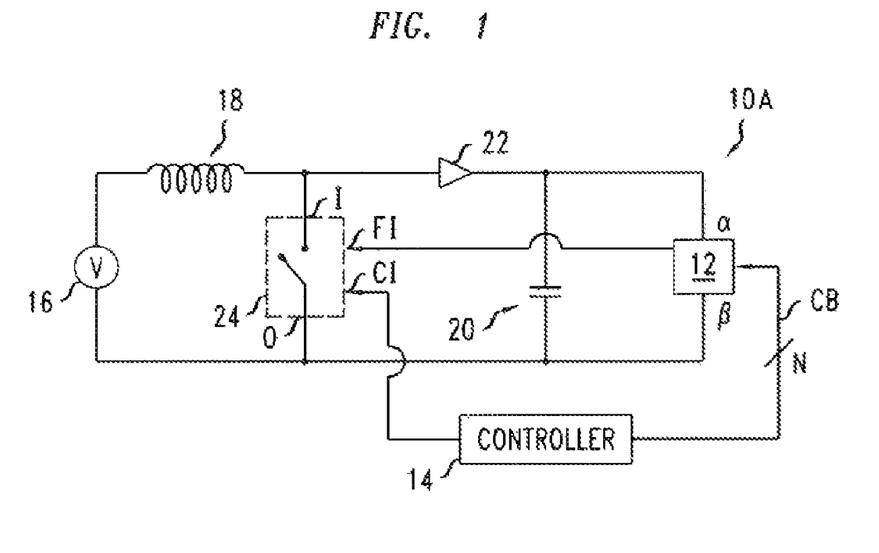
FIG. 1 is a circuit diagram for an embodiment of a boost DC-to-DC voltage converter in which a DC voltage source and inductive, capacitive, and switching circuit elements are temporally shared by multiple electronic loads.
Figure 2:
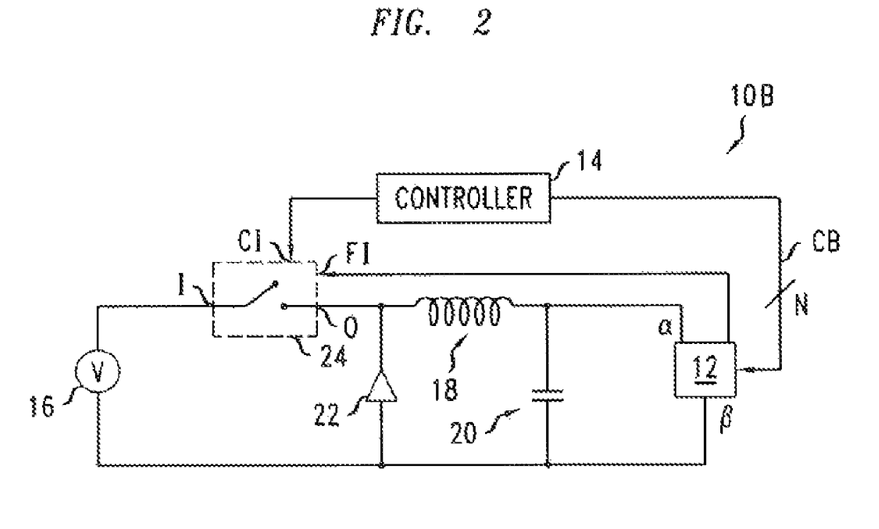
FIG. 2 is a circuit diagram for an embodiment of a buck DC-to-DC voltage converter in which a DC voltage source and inductive, capacitive, and switching circuit elements are temporally shared by multiple electronic loads.
Figure 3:
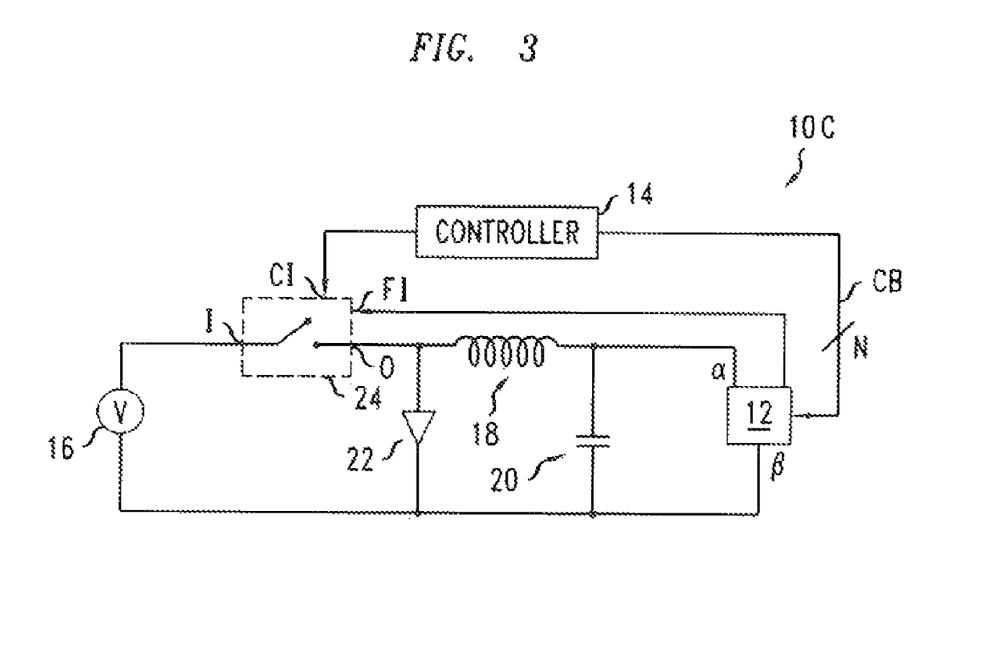
FIG. 3 is a circuit diagram for an embodiment of an alternate buck DC-to-DC voltage converter in which a DC voltage source and inductive, capacitive, and switching circuit elements are temporally shared by multiple electronic loads.
Figure 4:
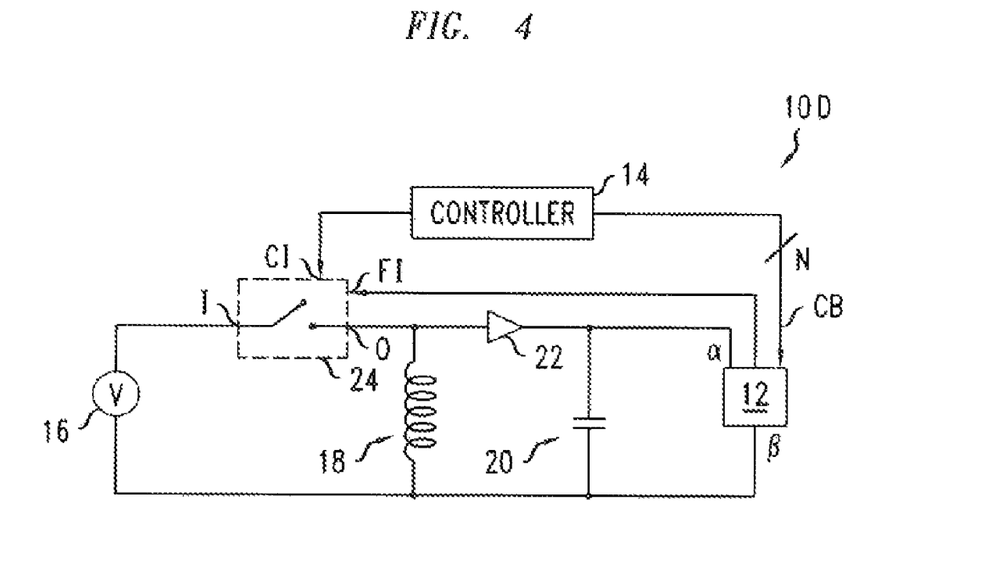
FIG. 4 is a circuit diagram for an embodiment of a buck-boost DC-to-DC voltage converter in which a DC voltage source and inductive, capacitive, and switching circuit elements are temporally shared by multiple electronic loads.
Figure 5:
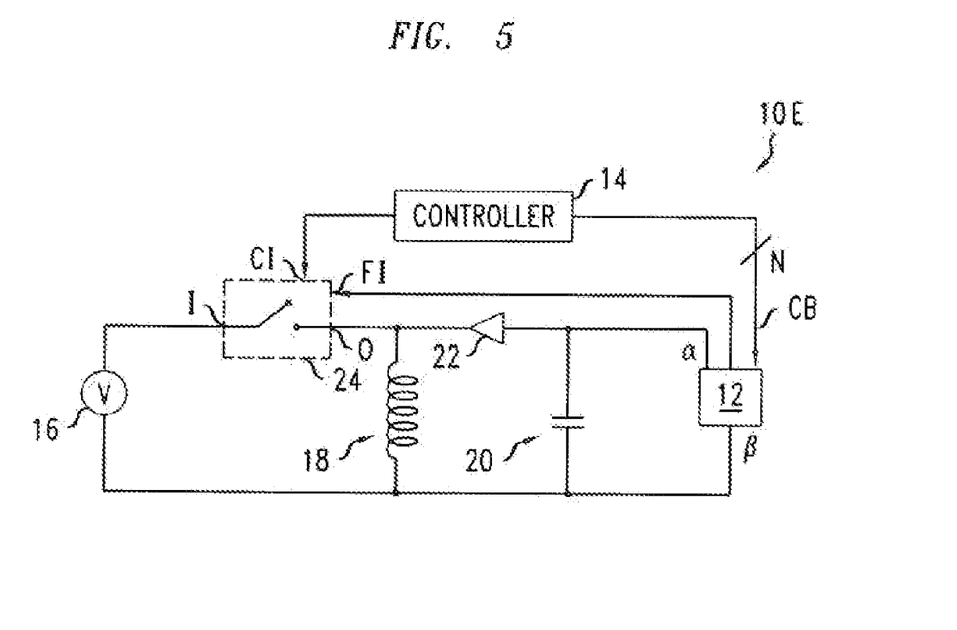
FIG. 5 is a circuit diagram for an alternate embodiment of a buck-boost DC-to-DC voltage converter in which a DC voltage source and inductive, capacitive, and switching circuit elements are shared by multiple electronic loads.
Figure 6:
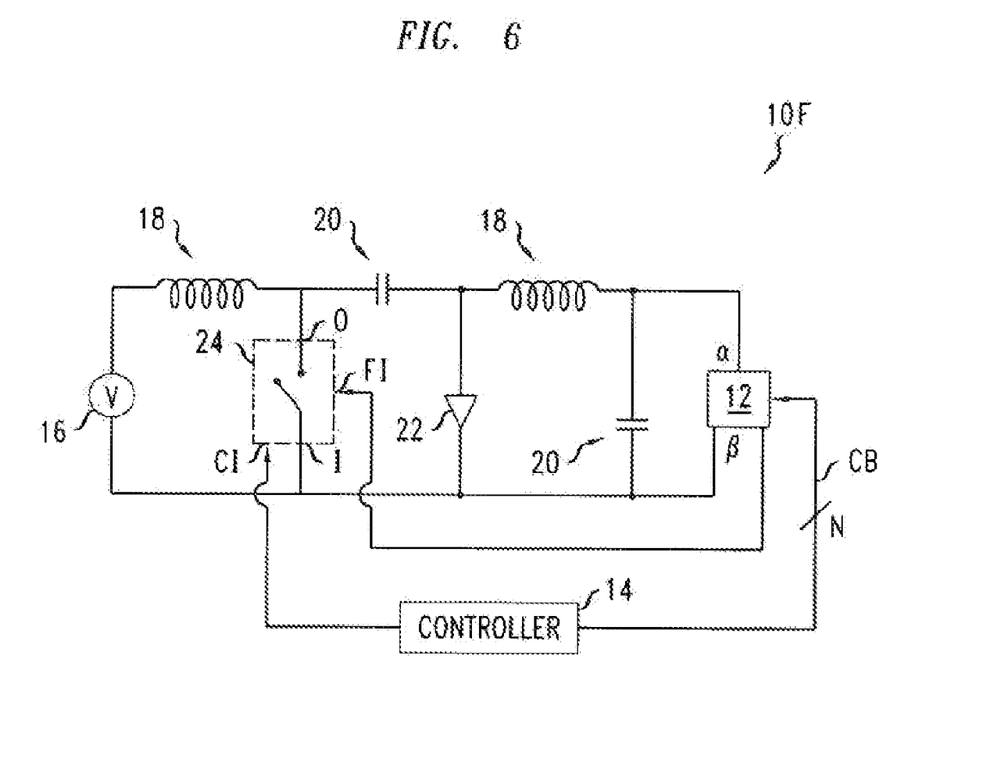
FIG. 6 is a circuit diagram for an embodiment of a CUK DC-to-DC voltage converter in which a DC voltage source and inductive, capacitive, and switching circuit elements are temporally shared by multiple electronic loads.
Figure 7:
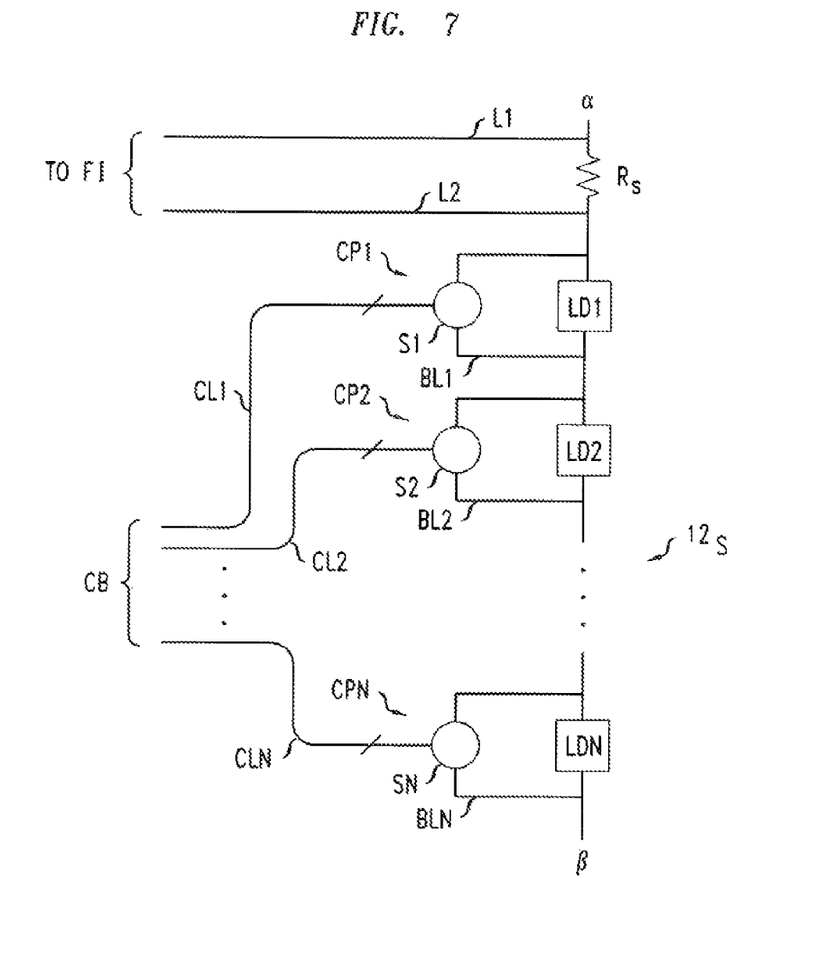
FIG. 7 is a circuit diagram illustrating a series-type embodiment of an output driver circuit path for the DC-to-DC voltage converters of FIGS. 1-6.

Commercially available integrated circuits (ICs) may be suitable for the switching circuit 24 and parts of the electronic controller 14. For example, Linear Technologies Inc of 1630 McCarthy Blvd., Milpitas, Calif. 95035-7417 (www.linear.com) sells products with identification numbers LT3518, LT3477, and LT3478, and these products may be suitable for the switching circuit 24 and parts of the electronic controller 14. Some such ICs may have feedback inputs, FI, for feeding back a voltage drop over a sense resistor, $R_S$, e.g., as shown in FIGS. 7-8, to regulate the switching circuit 24. The switching circuit 24 can use such a fedback voltage to adjust its duty value in a manner that stabilizes the current in the output driver circuit 12 to a preselected value as described below. Some such ICs may also have a control input (CI) to apply a DC bias voltage to regulate the duty value, D, of the switching circuit 24.

The duty value, D, of the switching circuit 24 approximately defines the relation between the DC output voltage, $V_O$, of the DC-to-DC voltage converter and its DC source voltage, $V_S$, at steady state operation. In the continuous current mode, the current in the inductor(s) of the DC-to-DC voltage converters 10A-10F do not go to zero. For the exemplary DC-to-DC voltage converters 10A-10F, the relations between $V_O$ and $V_S$ are shown in the below Table 1 for the continuous current mode at steady state operation.

TABLE 1

Source and Output Voltage relations in continuous current mode

| DC-to-DC voltage converter | Relation between $V_o$ and $V_s$ |
|---|---|
| Boost | $V_o \cong V_s/(1 - D)$ |
| Buck | $V_o \cong D \cdot V_s$ |
| Buck-Boost | $V_o \cong -D \cdot V_s/(1 - D)$ |
| CUK | $V_o \cong -D \cdot V_s/(1 - D)$ |

Thus, various embodiments of the DC-to-DC voltage converters 10A-10F may use the electronic controller 14 to adjust the duty value, D, of the switching circuit 24 to operate in a manner substantially consistent with the relations of Table 1 to produce desired output voltages, $V_O$.

In the DC-to-DC voltage converters 10A-10F, the output driver circuit path 12 may be, e.g., in a series embodiment $12_S$, as shown in FIG. 7, or a parallel embodiment $12_P$, as shown in FIG. 8. In both embodiments $12_S$, $12_P$, N, individual electronic loads LD1, LD2, ..., LDN either connect across corresponding circuit paths CP1, CP2, ..., CPN or form parts of said circuit paths CP1, ..., CPN. The electronic loads LD1, ..., LDN are driven by the DC-to-DC voltage converters 10A-10F in a time-interleaved manner, i.e., a time division multiplexed manner. Here, the integer N is greater or equal to two, e.g., 2, 3, 4, or 5.

Referring to FIG. 7, the series embodiments $12_S$ connect the circuit paths CP1, ..., CPN in series to form the output driver circuit paths 12 of FIGS. 1-6. Each circuit path CP1, CP2, ..., CPN is a shunt circuit path that includes a switch Sl, S2, ..., SN there along. The electronic loads LD1, ..., LDN connect across ends of corresponding circuit paths CP1, ..., CPN. Thus, each pair of ends of a circuit path CP1, ..., CPN functions as a pair of outputs of the DC-to-DC voltage converters 10A-1OF in the series embodiments $12_S$. The switches Sl, S2, ..., SN open and close the shunt circuit paths in response to control voltages applied thereto. The control voltages are configured to have one of two values where the corresponding circuit path CP1, ..., CPN is open for one value and closed for the other value. Thus, an output current flows substantially only through the circuit path CP1, ..., CPN if the path's switch S1, ..., SN is closed and flows substantially only through the corresponding electronic load LD1, ..., LDN if the path's switch S1, ..., SN is open.

During typical driving operation of the series embodiments $12_S$, the electronic controller 14 applies control voltages to the switches S1, S2, ..., SN via the control lines CL1, CL2, ..., CLN of a control-line bundle CB. The control voltages determine which of the corresponding circuit paths CP1, ..., CPN will be open and which will be closed. In particular, the electronic controller 14 typically applies a set of control voltages that simultaneously cause N-1 of the switches S1, . . . , SN to be closed and causes the remaining one switch S1, . . . , SN to be open during driving operation. Thus, only one of the N electronic loads LD1, . . . , LDN is typically driven by the output voltage, $V_O$, of the DC-to-DC voltage converters 10A-10F at any one time in the series embodiment $12_S$. The electronic controller 14 alternates the form of the set of control voltages so that different ones of the electronic loads LD1, . . . , LDN are driven at different times. That is, the electronic controller 14 controls the output driver circuit path $12_S$ in a manner that time division multiplexes the driving of the electronic loads LD1, . . . , LDN.

Referring to FIG. 8, the parallel embodiments $12_P$ connect the circuit paths CP1, . . . , CPN in parallel to form the output driver circuit path 12 of FIGS. 1-6. Each circuit path CP1, CP1 . . . , CPN includes a corresponding switch S1, S2, . . . , SN and a corresponding electronic load LD1, LD2, . . . , LDN there along. Thus, two points on each circuit path CP1, . . . , CPN function as a pair of outputs of the DC-to-DC voltage converters 10A-10F in the parallel embodiments $12_P$. The switches S1, . . . , SN open and close in response to applied control voltages. That is, each control voltages has one of two values so that the corresponding circuit paths CP1, . . . , CPN is open for one value and is closed for the other value. An output drive current flows to one of the electronic loads LD1, . . . , LDN only if the switch S1, . . . , SN on the same circuit path CP1, . . . , CPN is closed.

During typical driving operation of the parallel embodiments $12_P$, the electronic controller 14 applies the control voltages to the switches S1, S2, . . . , SN via the control lines CL1, CL2, . . . , CLN of the control line bundle CB. The control voltages determine which of the corresponding circuit paths CP1, . . . , CPN is closed. In particular, the electronic controller 14 applies a set of control voltages that simultaneously cause N-1 of the switches S1, . . . , SN to be open and that cause the remaining one switch S1, . . . , SN to be closed. Thus, only one of the N electronic loads LD1, . . . , LDN is typically driven by the output voltage, $V_O$, of the DC-to-DC voltage converters 10A-10F at any one time. In the parallel embodiment $12_P$, the electronic controller 14 again alternates the forms of the set of control voltages so that different ones of the electronic loads LD1, . . . , LDN are driven at different times. That is, the electronic controller 14 controls the output driver circuit path 12 in a manner that time division multiplexes the driving of the electronic loads LD1, . . . , LDN.

The parallel embodiment $12_P$ of the output driver circuit paths 12 may optionally include an additional shunt circuit path CP0 that is controlled by a switch S0. The shunt circuit path CP0 can be closed by a control voltage applied to control line CL0 via the electronic controller 14 so that the parallel embodiment $12_P$ of the output driver circuit path 12 can function as a shunt circuit path without passing any current through the electronic loads LD1, . . . , LDN. Such shunting may be useful to discharge charges on the capacitor(s) 20 of the DC-to-DC voltage converters 10A-10F as further described below.

Both the series and parallel embodiments $12_S$, $12_P$ of the output driver circuit paths 12 may also optionally include a small sense resistor, e.g., of less than about 1 ohm. In some embodiments, the voltage across the sense resistor is fedback to sensing inputs FI of the switching circuits 24 of FIGS. 1-6 to enable feedback control or stabilization of output voltages or currents to the N electronic loads LD1-LDN in the DC-to-DC voltage converters 10A-10F. In particular, some of the DC-to-DC voltage converters 10A-10F can vary their duty value, D, based on such a feedback measurements. Such a feedback control may be useful, e.g., to compensate for temperature variations and/or changes in the electronic loads LD1-LDN during operation.

Figure 9:
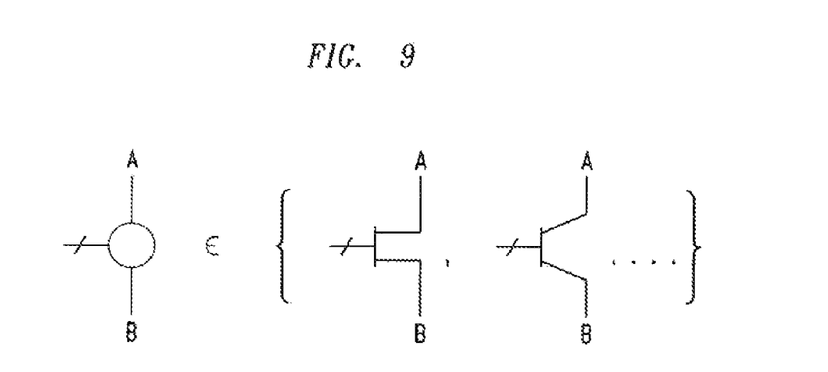
FIG. 9 illustrates circuits for exemplary 3-terminal switches for the output driver circuit paths of FIGS. 7-8.

FIG. 9 shows some exemplary forms for the switches S1, . . . , SN of the series and parallel embodiments $12_S$, $12_P$ of the output driver circuit paths 12, as shown in FIGS. 7-8. The switches S1, . . . , SN may be field-effect transistors (FETs) so that the control inputs are gates of the FETs. The switches S1, . . . , SN may be field effect transistor switch circuits. The switches S1, . . . , SN may also be bipolar transistor switches so that the control inputs are bases of the bipolar transistors. Other embodiments of the switches S1, . . . , SN may be based on other conventional circuits for controllable ON/OFF types of switches.

Figure 10:
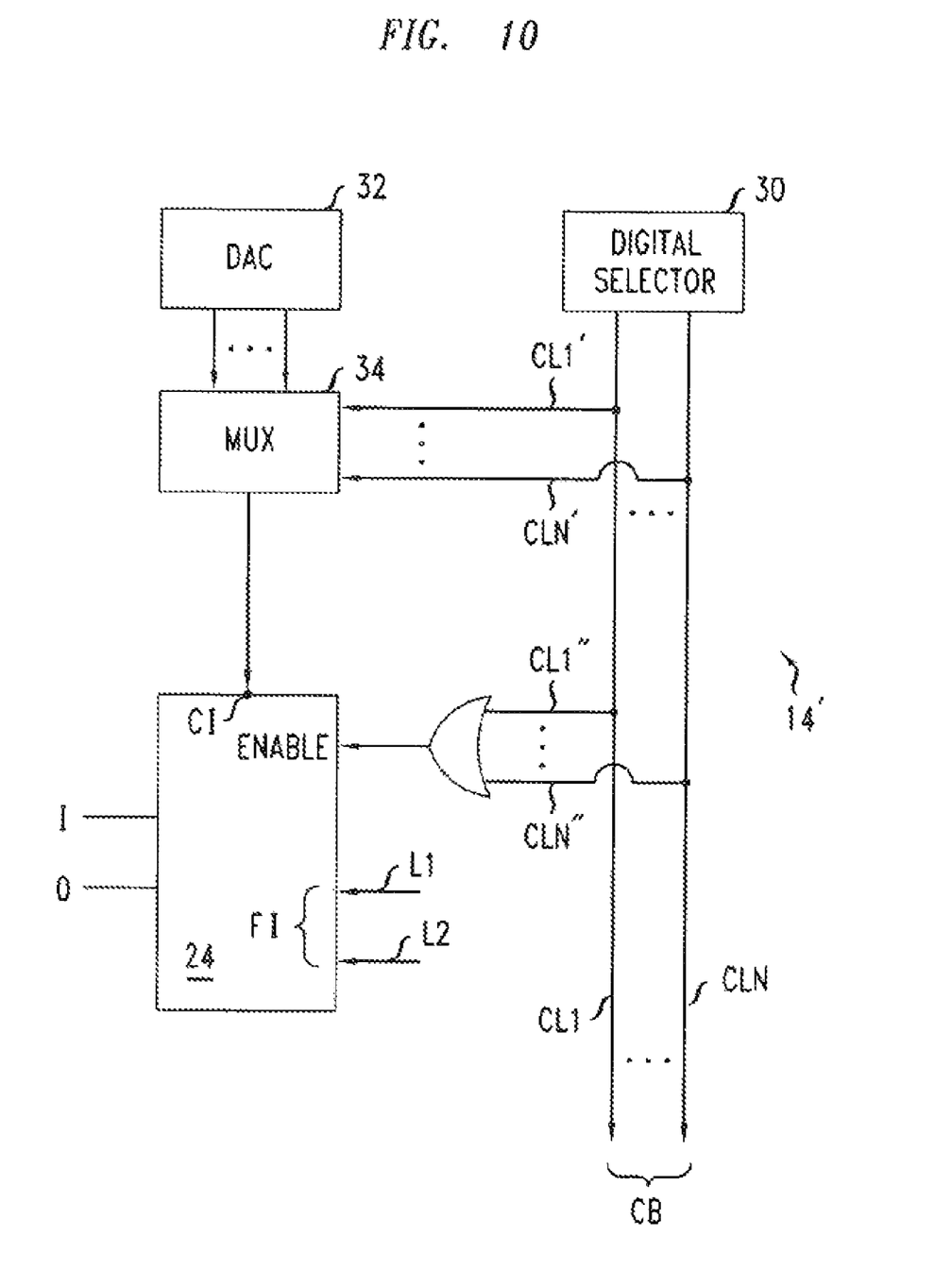
FIG. 10 is a circuit diagram illustrating one embodiment of a controller for the DC-to-DC voltage converters of FIGS. 1-6.

FIG. 10 shows an exemplary embodiment 14' for the electronic controller 14 of FIGS. 1-6. The electronic controller 14' includes a digital selector circuit 30 and optionally includes a digital-to-analog converter (DAC) 32, an Mx1 multiplexer (MUX) 34, and an optional N-to-1 OR gate 36.

The digital selector 30 produces the sets of N binary valued voltages that operate the N switches S1-SN of the output driver circuit path 12. In particular, each set of voltages typically causes the N switches S1-SN to selectively apply the output voltage, $V_O$, of the DC-to-DC voltage converters 10A-10F to one electronic load LD1-LDN at a time. The digital selector 30 selects the order and timing with which the N electronic loads LD1-LDN are driven.

The optional DAC 32 produces a different voltage value on each of its M outputs. Here, M is less than or equal to N. Each output of the DAC connects to one of the inputs of the Mx1 MUX 34. The Mx1 MUX 34 has an output that applies a control voltage to an optional control input, CI, of the switching circuit 24. The control voltage controls the duty value, D, of the switching circuit 24, e.g., by fixing a DC bias applied to a gate or base of a transistor switch. By fixing the duty value, D, of the switching circuit 24, the control voltage determines the output voltage, $V_O$, such embodiments of the DC-to-DC voltage converters 10A-10F of FIGS. 1-6 during steady state operation. Thus, by controlling the MUX 34, the digital selector 30 is able, e.g., to cause the DC-to-DC voltage converters 10A-10F to apply different output voltages, $V_O$, across or send different currents through different ones of the electronic loads LD1-LDN.

In an alternative embodiment, a single DAC can replace, e.g., the DAC 32 and the MUX 34. In such embodiments, the digital selector 30 would send a corresponding a digital value directly to the single DAC, which would present a desired voltage output to the control input, CI, of the switching circuit 24.

The optional N-to-1 OR gate 36 applies a digital control signal to an optional enable input on the switching circuit 24. For example, the N-to-1 OR gate 36 may enable the switching circuit 24 whenever any of the electronic loads LD1-LDN of FIGS. 7 and 8 is configured to be driven by the DC-to-DC voltage converters 10A-10F. Of course, other embodiments may use other conventional methods to enable the switching circuit 24 when the output driver circuit path 12 is configured to drive one of the N electronic loads connected thereto.

Figure 11:
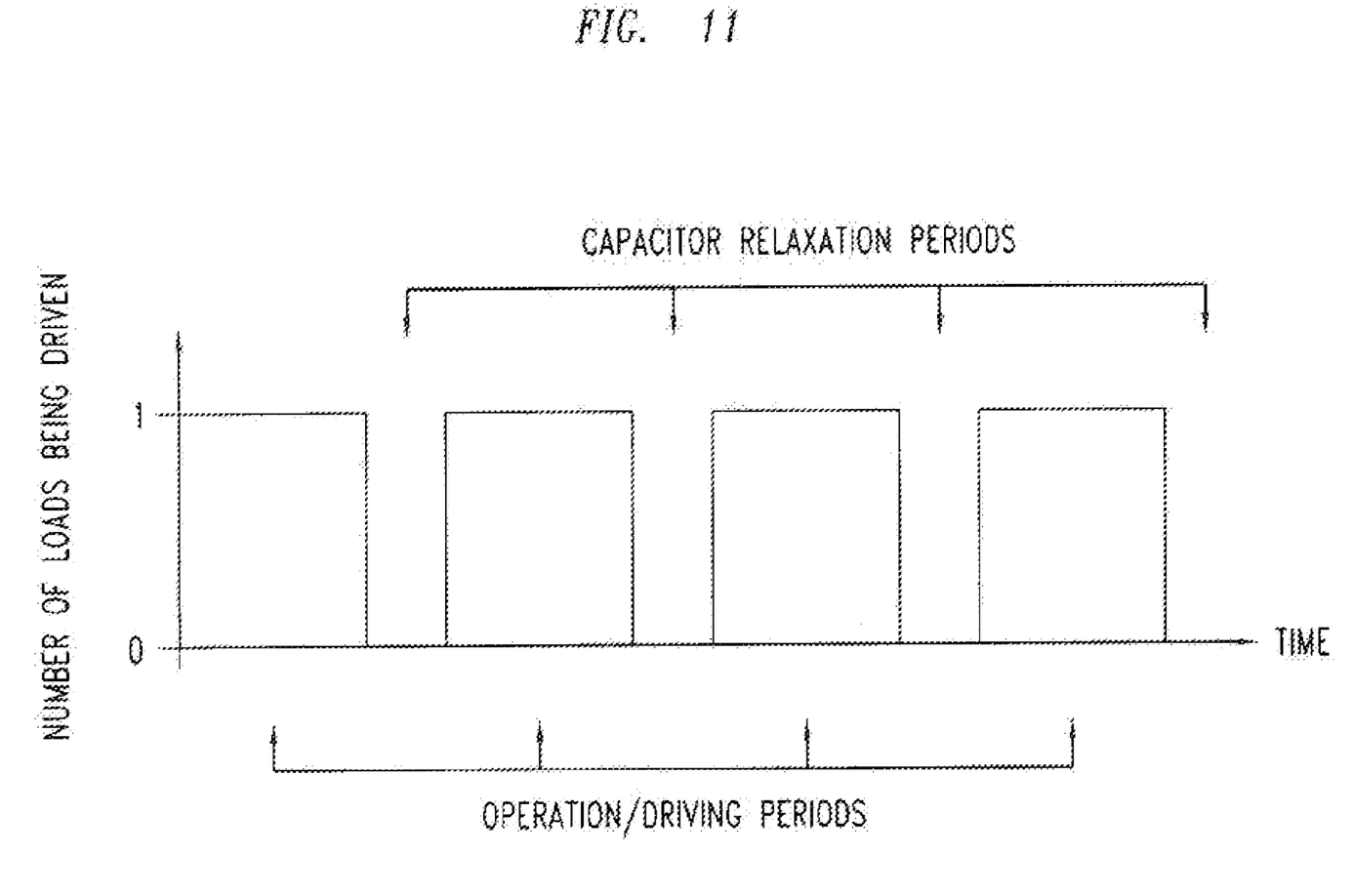
FIG. 11 is a timing diagram illustrating a method of operating DC-to-DC voltage converters, e.g., the DC-to-DC voltage converters of FIGS. 1-6.

FIG. 11 is a timing diagram for an exemplary method 38 of operating the DC-to-DC voltage converters 10A-10F of FIGS. 1-6. In this method, the DC-to-DC voltage converters 10A-10F are operated to alternate between being in driving periods and being in relaxation periods as illustrated by the flow chart of FIG. 12. During each driving period, the electronic controller 14 configures the output driver circuit path 12 to apply a driving voltage across one or more of the N electronic loads, e.g., the loads LD1-LDN of FIGS. 7 and 8, and also typically configures the output driver circuit path 12 to not apply a driving voltage across the remaining N-1 electronic loads. In some embodiments, the electronic controller 14 may sequentially drive a plurality of the electronic loads. For example, the electronic controller 14 may drive all N of the electronic loads LD1-LDN, i.e., one load at a time. In alternate embodiments, the electronic controller 14 may drive only one electronic load or, at least, less than all N of the electronic loads in the single driving period. During each relaxation period, the electronic controller 14 configures the output driver circuit path 12 to not apply a driving voltage across any of the N electronic loads. Instead, in these periods, the electronic controller 14 configures the output driver circuit path 12 to enable any capacitor(s) 20 to discharge stored charges without driving any of the electronic loads. In the series embodiment $12_S$, the electronic controller 14 would close all N switches S1-SN during the relaxation period. In the parallel embodiment $12_P$, the electronic controller 14 would open all N switches S1-SN and close the switch S0 for the shunt circuit path during the relaxation period. The method 38 includes repeating the performance of the driving and relaxation periods, e.g., to drive more of the electronic loads and/or to drive the same electronic loads again.

Each relaxation period enables the capacitor(s) 20 to discharge charges that are too high for driving the next electronic load to-be-driven. By using such relaxation periods, the DC-to-DC voltage converters 10A-10F can drive the electronic loads of arrays in which one or more of the electronic loads could be damaged by voltage and/or current values needed to drive other(s) of the electronic loads.

For capacitors 20 of moderate size, the relaxation periods can even be orders of magnitude shorter than the driving periods thereby not wasting substantial amounts of driving time.

In the method 38 the sequence of driving periods (DPs) and relaxation periods (RPs) may be arranged to minimize the amount of relaxation needed. For example, the DPs may be ordered so that the charge stored on capacitor(s) 20 increases monotonically over one cycle in which all of the electronic loads are driven one time. In such an embodiment, the capacitor(s) discharge(s) only at the end of the whole cycle. Such an embodiment eliminates the need to discharge the capacitor(s) 20, e.g., so that a single drive cycle of all of the electronic loads can proceed without performing a relaxation to discharge the capacitor(s) 20. For example, in the parallel embodiment $12_P$ of FIG. 8, the controller 14 would, e.g., only close the switch SO of the output driver circuit path 12 to discharge the capacitor(s) at the end of a cycle over which all N electronic loads LD1-LDN have been driven.

Figure 12:
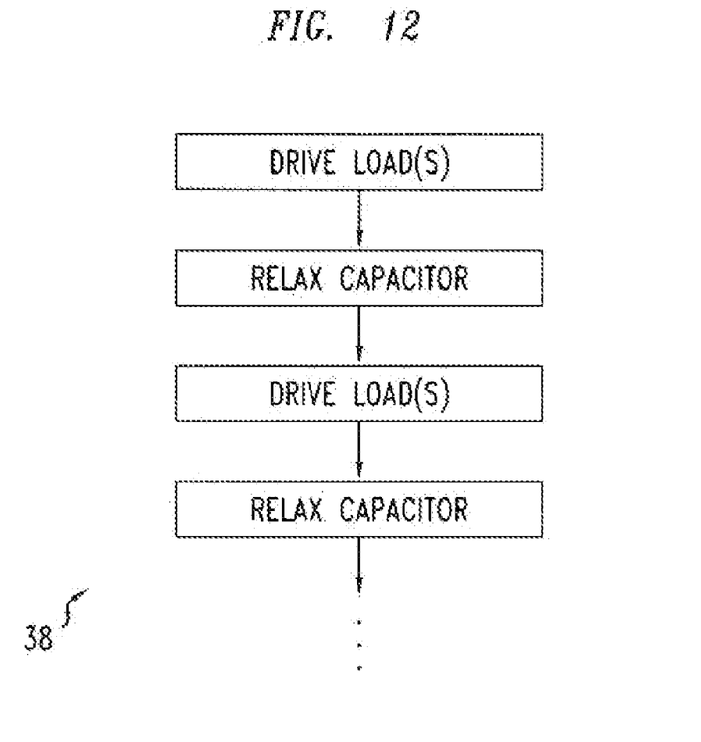
FIG. 12 is a flow chart illustrating the method of FIG. 11.

FIG. 12 illustrates a method 40 of operating a temporally-shared DC-to-DC voltage converter to drive a plurality of N electronic loads, e.g., the DC-to-DC voltage converters 10A-10F of FIGS. 1-6. The method 40 includes operating the DC-to-DC voltage converter to apply driving voltages across individual electronic loads of the plurality during a sequence of time periods so that the loads are driven in a time division multiplexed manner (step 42). The operating step 42 may include closing shunt circuit path(s), e.g., N-1 of the circuit paths CP1-CPN of FIG. 7, to cause the applied current and voltage to bypass the corresponding electronic load(s), i.e., the load(s) not being driven at that time. The operating step 42 may alternately include opening N-1 switch(es), e.g., N-1 of the circuit paths CP1-CPN of FIG. 8, to cause the applied current and voltage to bypass the corresponding electronic load(s), i.e., the load(s) not being driven at that time. In the operating step 42, one voltage may be applied across one electronic load and a different voltage may be applied across one or more other electronic loads. The method 40 may include interleaving such driving periods with capacitor relaxation periods as described in the above method 38.

Figure 13:
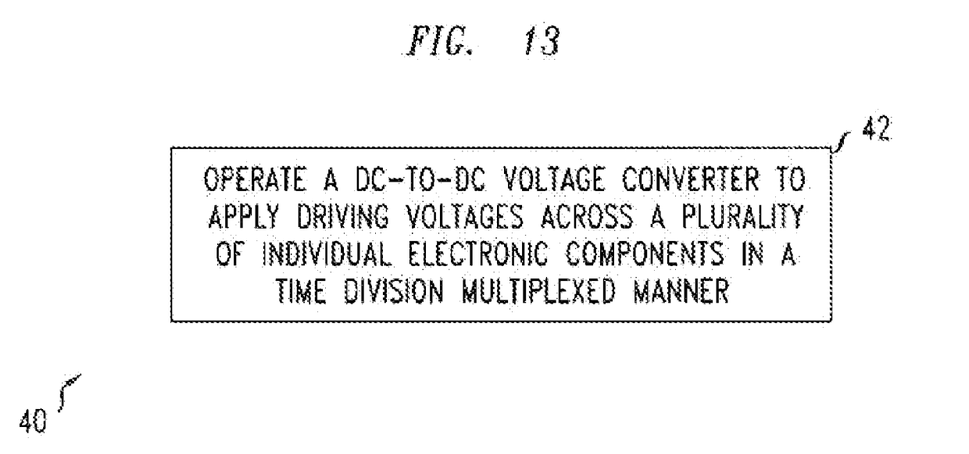
FIG. 13 illustrates a method of operating DC-to-DC voltage converters that temporally share output voltages among different electronic loads, e.g., the DC-to-DC voltage converters FIGS. 1-6.

In some embodiments, the DC-to-DC voltage converters 10A-10F of FIGS. 1-10 and methods 38, 40 of FIGS. 11-13 may also be configured to simultaneously driving more than one of the electronic loads in some of the driving periods.

The invention is intended to include other embodiments that would be obvious to a person of ordinary skill in the art in light of the description, figures, and claims.

What is claimed is:

1. An apparatus for driving a plurality of electronic loads, comprising:
   a DC-to-DC voltage converter having a variable voltage output; and
   a controller, the controller being configured to:
      select one or more of the plurality of electronic loads and a corresponding output voltage level of the variable voltage output; and
      apply a plurality of voltage levels from the variable voltage output across the plurality of electronic loads in accordance with the correspondence and a time division multiplexed scheme;
      wherein the correspondence is established prior to the selection, and
      wherein the selection of one or more of the plurality of electronic loads is done by effecting a shunt across the unselected one or more of the plurality of electronic loads.

2. The apparatus of claim 1, wherein the shunt is realizable using a plurality of shunt circuit paths, each shunt circuit path connecting between the outputs of a corresponding one of the electronic loads and having a switch there along.

3. The apparatus of claim 2, wherein the shunt circuit paths are electrically connected in series.

4. The apparatus of claim 1, wherein the variable voltage output further comprises circuit paths connected in parallel, each circuit path having the outputs of a corresponding one of the electronic loads there along and having a controllable switch there along.

5. The apparatus of claim 1, wherein the electronic loads comprise a first load operable at a first voltage and a second load operable at a different second voltage.

6. The apparatus of claim 5, wherein some of the electronic loads are light emitting diodes, each light source being configured to emit light of a different color.

7. The apparatus of claim 1, wherein the controller is further configured to shunt all of the plurality of electronic loads during certain times according to the time division multiplexed scheme.

8. An apparatus for driving a plurality of electronic loads, comprising:
   a DC-to-DC voltage converter having a variable voltage output, the plurality of electronic loads being connected to share the DC-to-DC voltage converter over a plurality of circuit paths;
   a controller, the controller being configured to:
      select one or more of the plurality of electronic loads and a corresponding output voltage level of the variable voltage output;
      apply a plurality of voltage levels from the variable voltage output across the plurality of electronic loads in accordance with the correspondence and a time division multiplexed scheme; and
      effect a shunt across all of the plurality of electronic loads during certain times according to the time division multiplexed scheme;

wherein the correspondence is established prior to the selection;

wherein the loads are either connected across corresponding ones of the circuit paths or are part of corresponding ones of the circuit paths; and wherein each path includes a switch there along and the controller is connected to operate the switches.

9. The apparatus of claim 8, wherein the controller is configured to open only one of the switches at a time during driving of the loads.

10. The apparatus of claim 8, wherein each circuit path is a shunt path for the corresponding one of the electronic loads, and the circuit paths are electrically connected in series.

11. The apparatus of claim 8, wherein the circuit paths are electrically connected in parallel and the loads are part of corresponding ones of the circuit paths.

12. The apparatus of claim 8, wherein the DC-to-DC voltage converter is one of a boost DC-to-DC voltage converter, a buck DC-to-DC voltage converter, a buck-boost DC-to-DC voltage converter, and a CUK DC-to-DC voltage converter.

13. The apparatus of claim 8, wherein the electronic loads comprise a first load operable at a first voltage and a second load operable at a different second voltage.

14. The apparatus of claim 8, wherein the DC-to-DC voltage converter is configured to apply a first voltage across a first of the loads and to apply a different second voltage across a second of the loads.

15. A method of driving a plurality of electronic loads, comprising:

selecting, by a controller, one or more of the plurality of electronic loads and a corresponding output voltage level of a DC-to-DC voltage converter having a variable voltage output; and operating, by the DC-to-DC voltage converter in combination with the controller, a plurality of voltage levels from the variable voltage output across the plurality of electronic loads in accordance with the correspondence and a time division multiplexed scheme;

wherein the correspondence is established prior to the selection, and wherein the selecting of one or more of the plurality of electronic loads is done by effecting a shunt across the unselected one or more of the plurality of electronic loads.

16. The method of claim 15, wherein the operating includes having the DC-to-DC voltage converter apply a first voltage across one of the electronic components and a different second voltage across another of the electronic components.

17. The method of claim 15, wherein the operating includes simultaneously closing a circuit path with one of the electronic components and opening one or more circuit paths with any other of electronic components when the DC-to-DC voltage converter is applying a voltage to the one of the electronic components, the circuit paths being connected in parallel.

18. The method of claim 15, further comprising:

effecting a shunt across all of the plurality of electronic components during certain times according to the time division multiplexed scheme;

then, discharging a capacitor during the certain times; and then, repeating the operating step;

wherein charges on the capacitor drive the electronic components.

* * * * *